US012561262B2

(12) United States Patent
Vemula et al.

(10) Patent No.: US 12,561,262 B2
(45) Date of Patent: Feb. 24, 2026

(54) INTEGRATED CIRCUITS INCLUDING NETWORK INTERFACE CONTROLLERS FOR DATA TRANSFERS ASSISTED BY SOFTWARE AND RELATED METHODS

(71) Applicant: Microsoft Technology Licensing, LLC, Redmond, WA (US)

(72) Inventors: Suresh Vemula, Tracy, CA (US); John David Huber, San Diego, CA (US); Kaveri Purandare, Pleasanton, CA (US); Larry Steven Wise, Georgetown, TX (US); Nirranjan Kirubaharan, Bengaluru (IN); Tao Yu, Campbell, CA (US); Saurin Kanjibhai Patel, Dublin, CA (US); Wael Noureddine, Los Altos, CA (US); Narendra Jayawant Gathoo, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/755,264

(22) Filed: Jun. 26, 2024

(65) Prior Publication Data

US 2026/0003811 A1    Jan. 1, 2026

(51) Int. Cl.
*G06F 13/36* (2006.01)

(52) U.S. Cl.
CPC .......... *G06F 13/36* (2013.01); *G06F 2213/40* (2013.01)

(58) Field of Classification Search
None
See application file for complete search history.

(56) References Cited

U.S. PATENT DOCUMENTS

| | | | |
|---|---|---|---|
| 8,122,155 B1 * | 2/2012 | Marti ..................... | G06F 13/28 709/212 |
| 8,244,825 B2 * | 8/2012 | Subramanian ...... | H04L 67/1097 709/215 |
| 9,298,642 B2 * | 3/2016 | Kagan ................. | G06F 12/1081 |
| 9,648,081 B2 * | 5/2017 | Raikin ................... | H04L 67/02 |
| 11,308,024 B2 * | 4/2022 | Chen ...................... | H04L 69/22 |

(Continued)

OTHER PUBLICATIONS

International Search Report and Written Opinion received for PCT Application No. PCT/US2025/019268, mailed on Jun. 24, 2025, 13 pages.

*Primary Examiner* — Elias Mamo

(57) ABSTRACT

A network interface controller (NIC) circuit may control data transfers between a network interface and a memory interface circuit. The NIC circuit receives data packets on the network interface and determines whether a packet type of a data packet corresponds to one of a first plurality of operations or a second plurality of operations. For data packets that correspond to one of the first plurality of operations, the NIC circuit controls the memory interface circuit according to the packet type and for data packets that correspond to one of the second plurality of operations, the NIC sends a notification to a processor circuit in the IC to execute software instructions to control the memory interface circuit according to the packet type. The NIC circuit quickly processes data packets corresponding to the first plurality of operations without software involvement but relies on software assistance for the second plurality of operations.

24 Claims, 6 Drawing Sheets

(56)                     References Cited

U.S. PATENT DOCUMENTS

2006/0095754  A1      5/2006  Hyder
2010/0183024  A1*     7/2010  Gupta ................... H04L 1/1685
                                                          714/748
2016/0380922  A1     12/2016  Gross, IV
2019/0079897  A1      3/2019  Kochevar-Cureton et al.
2021/0117360  A1      4/2021  Kutch

* cited by examiner

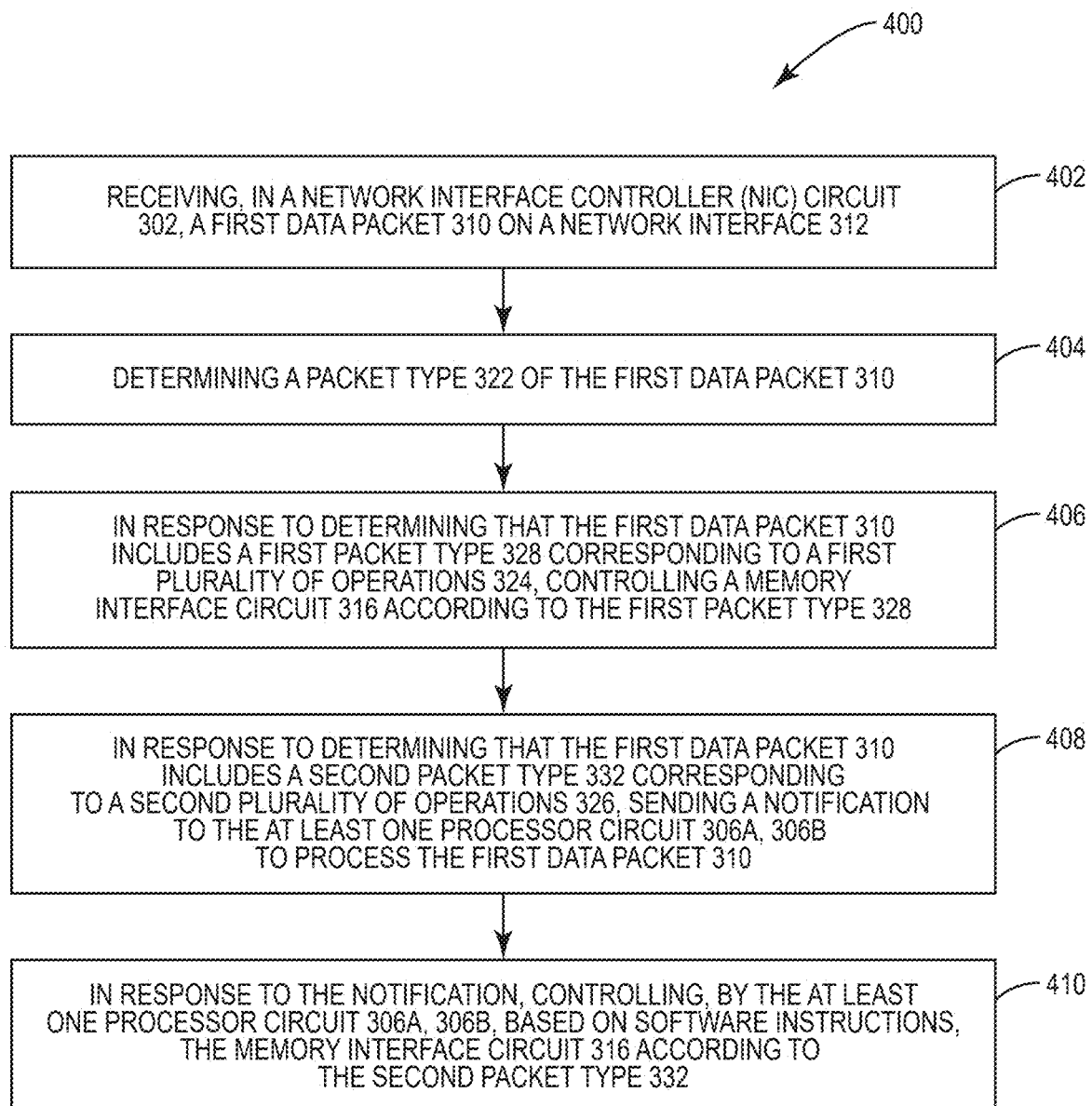

400

RECEIVING, IN A NETWORK INTERFACE CONTROLLER (NIC) CIRCUIT 302, A FIRST DATA PACKET 310 ON A NETWORK INTERFACE 312 — 402

DETERMINING A PACKET TYPE 322 OF THE FIRST DATA PACKET 310 — 404

IN RESPONSE TO DETERMINING THAT THE FIRST DATA PACKET 310 INCLUDES A FIRST PACKET TYPE 328 CORRESPONDING TO A FIRST PLURALITY OF OPERATIONS 324, CONTROLLING A MEMORY INTERFACE CIRCUIT 316 ACCORDING TO THE FIRST PACKET TYPE 328 — 406

IN RESPONSE TO DETERMINING THAT THE FIRST DATA PACKET 310 INCLUDES A SECOND PACKET TYPE 332 CORRESPONDING TO A SECOND PLURALITY OF OPERATIONS 326, SENDING A NOTIFICATION TO THE AT LEAST ONE PROCESSOR CIRCUIT 306A, 306B TO PROCESS THE FIRST DATA PACKET 310 — 408

IN RESPONSE TO THE NOTIFICATION, CONTROLLING, BY THE AT LEAST ONE PROCESSOR CIRCUIT 306A, 306B, BASED ON SOFTWARE INSTRUCTIONS, THE MEMORY INTERFACE CIRCUIT 316 ACCORDING TO THE SECOND PACKET TYPE 332 — 410

*FIG. 4*

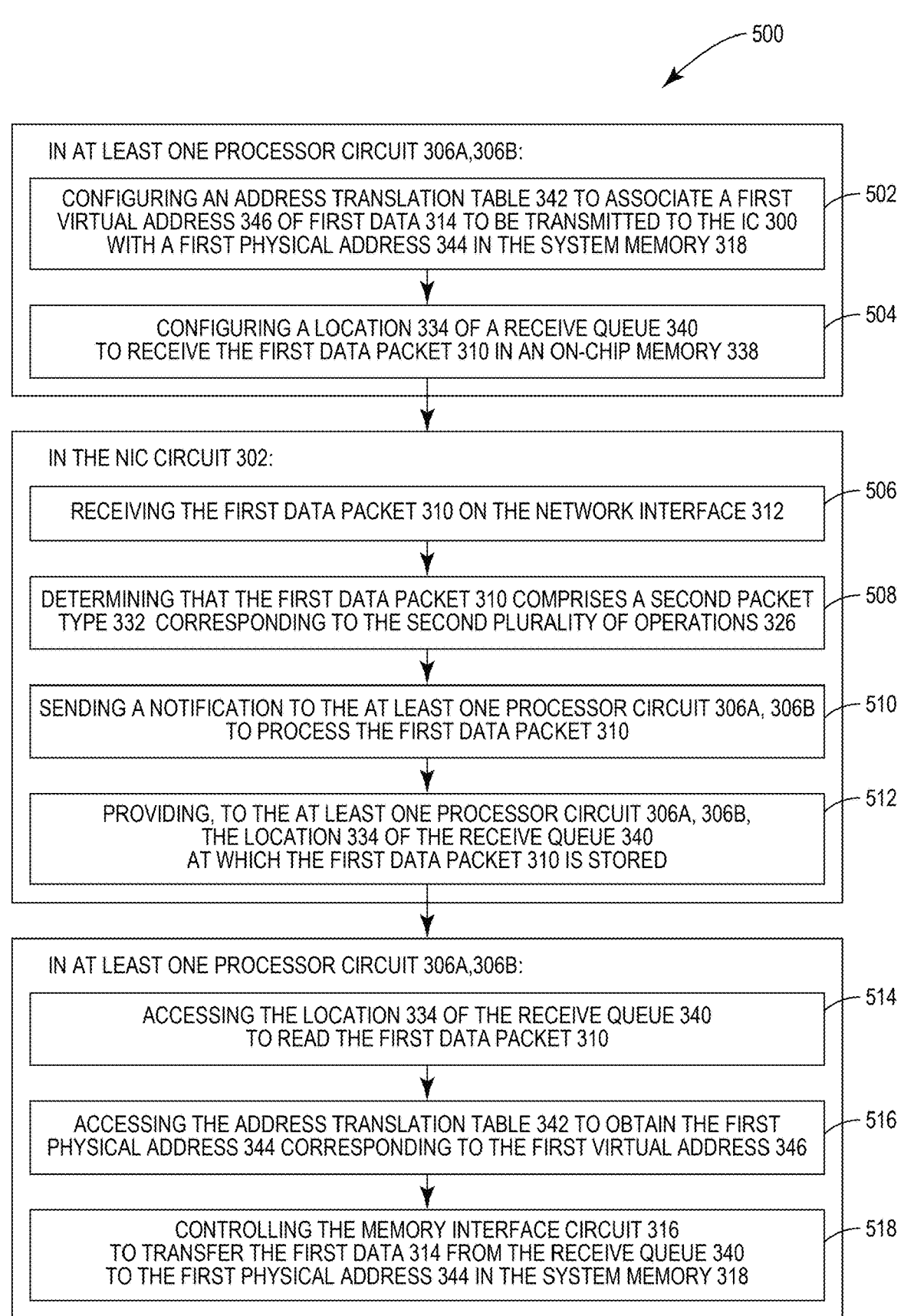

IN AT LEAST ONE PROCESSOR CIRCUIT 306A,306B:

CONFIGURING AN ADDRESS TRANSLATION TABLE 342 TO ASSOCIATE A FIRST VIRTUAL ADDRESS 346 OF FIRST DATA 314 TO BE TRANSMITTED TO THE IC 300 WITH A FIRST PHYSICAL ADDRESS 344 IN THE SYSTEM MEMORY 318 — 502

CONFIGURING A LOCATION 334 OF A RECEIVE QUEUE 340 TO RECEIVE THE FIRST DATA PACKET 310 IN AN ON-CHIP MEMORY 338 — 504

IN THE NIC CIRCUIT 302:

RECEIVING THE FIRST DATA PACKET 310 ON THE NETWORK INTERFACE 312 — 506

DETERMINING THAT THE FIRST DATA PACKET 310 COMPRISES A SECOND PACKET TYPE 332 CORRESPONDING TO THE SECOND PLURALITY OF OPERATIONS 326 — 508

SENDING A NOTIFICATION TO THE AT LEAST ONE PROCESSOR CIRCUIT 306A, 306B TO PROCESS THE FIRST DATA PACKET 310 — 510

PROVIDING, TO THE AT LEAST ONE PROCESSOR CIRCUIT 306A, 306B, THE LOCATION 334 OF THE RECEIVE QUEUE 340 AT WHICH THE FIRST DATA PACKET 310 IS STORED — 512

IN AT LEAST ONE PROCESSOR CIRCUIT 306A,306B:

ACCESSING THE LOCATION 334 OF THE RECEIVE QUEUE 340 TO READ THE FIRST DATA PACKET 310 — 514

ACCESSING THE ADDRESS TRANSLATION TABLE 342 TO OBTAIN THE FIRST PHYSICAL ADDRESS 344 CORRESPONDING TO THE FIRST VIRTUAL ADDRESS 346 — 516

CONTROLLING THE MEMORY INTERFACE CIRCUIT 316 TO TRANSFER THE FIRST DATA 314 FROM THE RECEIVE QUEUE 340 TO THE FIRST PHYSICAL ADDRESS 344 IN THE SYSTEM MEMORY 318 — 518

*FIG. 5*

INTEGRATED CIRCUITS INCLUDING NETWORK INTERFACE CONTROLLERS FOR DATA TRANSFERS ASSISTED BY SOFTWARE AND RELATED METHODS

FIELD OF THE DISCLOSURE

The technology of the disclosure relates, in general, to data transfers between a network interface and a memory interface and, more particularly, to optimizing performance and flexibility of data transfer operations.

BACKGROUND

Processor-based systems may include processor circuits that process data stored in a memory, and such data may be shared between processor-based systems. Processor-based systems may be interconnected by a network interface, and data can be transferred between processor-based systems over the network interface in data packets, with the data as a payload, according to a network interface protocol. Each of the processor-based systems may include network interface controllers (NICs) to control a data transfer between the network interface and a memory in a processor-based system. The NIC may be implemented on an integrated circuit (IC) as logic circuits for high performance.

SUMMARY

Exemplary aspects disclosed herein include integrated circuits (ICs) including network interface controllers (NICs) for data transfers assisted by software. Related methods of a network interface controller on an IC controlling a data transfer with software assistance are also disclosed. NICs may transfer data between a network interface and a memory interface. NICs may be implemented as logic circuits on an IC to control the sending and receiving of data on the network interface in data packets and control a memory interface circuit to store the data in a memory. The network interface may employ multiple protocol layers (e.g., transport, internet, link, etc.) that may be updated occasionally with corrections or improvements, but the logic circuits may have limited, if any, configurability, so the functionality of a NIC implemented entirely in hardware may become outdated.

An exemplary IC includes a NIC circuit configured to control data transfers between a network interface and a memory interface circuit. The NIC circuit receives data packets on the network interface and determines whether a packet type of a data packet corresponds to one of a first plurality of operations or one of a second plurality of operations. For data packets that correspond to one of the first plurality of operations, the NIC circuit controls the memory interface circuit according to the packet type and for data packets that correspond to one of the second plurality of operations, the NIC may send a notification to a processor circuit in the IC to execute software instructions to control the memory interface circuit according to the packet type. The NIC circuit may quickly process data packets corresponding to the first plurality of operations without software involvement but may rely on software assistance for data packets corresponding to the second plurality of operations. In some examples, the first plurality of operations may comprise the most frequently transferred packet types and/or correspond to the least complex operations, whereas the second plurality of operations may comprise less frequently used, more complex, and/or new operations for which the NIC circuit is not designed to handle. In this regard, the NIC circuit may provide higher performance operation for a majority of operations in the IC, while the software assistance may provide flexibility and forward compatibility. In some examples, the NIC circuit may support remote direct memory access (RDMA) over converged Ethernet (RoCE) to perform data transfers to and between an Ethernet interface and a memory coupled to the memory interface circuit.

In one exemplary aspect, an integrated circuit (IC) is disclosed. The IC includes a network interface controller (NIC) circuit coupled to a network interface, a memory interface circuit coupled to a memory interface, and at least one processor circuit. The NIC circuit is configured to receive a first data packet on the network interface and determine a packet type of the first data packet. In response to determining that the first packet type comprises a first packet type corresponding to a first operation of a first plurality of operations, the NIC circuit is configured to control the memory interface circuit according to the first packet type. In response to determining that the first data packet comprises a second packet type corresponding to a second plurality of operations, the NIC circuit is configured to send a notification to the at least one processor circuit to process the first data packet. The at least one processor circuit is configured to, in response to the notification, execute software instructions to control the memory interface circuit according to the second packet type.

In another exemplary aspect, a method in an integrated circuit (IC) is disclosed. The method includes receiving, in a network interface controller (NIC) circuit, a first data packet on a network interface. The method further includes determining a packet type of the first data packet. In response to determining that the first data packet comprises a first packet type corresponding to a first operation of a first plurality of operations, the method further includes controlling a memory interface circuit according to the first packet type. In response to determining that the first data packet comprises a second packet type corresponding to a second plurality of operations, the method further includes sending a notification to at least one processor circuit to execute software instructions to process the first data packet. In response to the notification, the method further includes controlling, by the at least one processor circuit based on software instructions, the memory interface circuit to transfer data according to the second packet type.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

FIG. 4 is a flow chart illustrating a method in an integrated circuit (IC) including an NIC circuit and at least one processor circuit to execute software to assist the NIC circuit with data transfers between a network interface and a memory interface;

Figure 6:
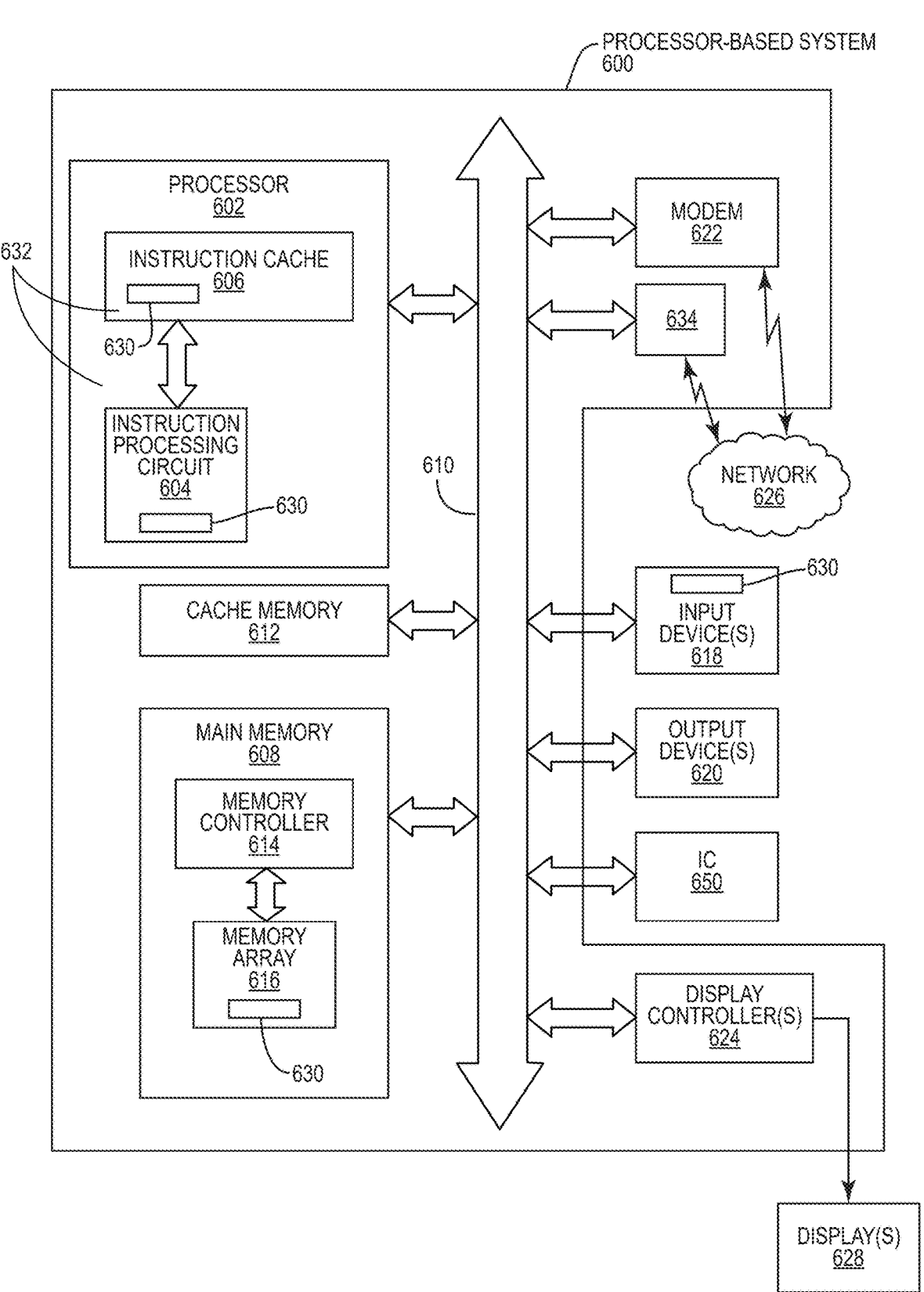

FIG. 5 is a flowchart illustrating a more detailed method in an IC of an NIC circuit that is assisted by software executing on at least one processor circuit for controlling data transfers between a network interface and a memory interface; and FIG. 6 is a block diagram of an exemplary processor-based system that comprises processing circuits included on an IC chip, including an NIC for data transfers between a network interface and memory with assistance from software executed on at least one processor circuit.

DETAILED DESCRIPTION

With reference to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Exemplary aspects disclosed herein include integrated circuits (ICs) including network interface controllers (NICs) for data transfers assisted by software. Related methods of a network interface controller on an IC controlling a data transfer with software assistance are also disclosed. NICs may transfer data between a network interface and a memory interface. NICs may be implemented as logic circuits on an IC to control the sending and receiving of data on the network interface in data packets and control a memory interface circuit to store the data in a memory. The network interface may employ multiple protocol layers (e.g., transport, internet, link, etc.) that may be updated occasionally with corrections or improvements, but the logic circuits may have limited, if any, configurability, so the functionality of an NIC implemented entirely in hardware may become outdated.

An exemplary IC includes a NIC circuit configured to control data transfers between a network interface and a memory interface circuit. The NIC circuit receives data packets on the network interface and determines whether a packet type of a data packet corresponds to one of a first plurality of operations or one of a second plurality of operations. For data packets that correspond to one of the first plurality of operations, the NIC circuit controls the memory interface circuit according to the packet type and for data packets that correspond to one of the second plurality of operations, the NIC may send a notification to a processor circuit in the IC to execute software instructions to control the memory interface circuit according to the packet type. The NIC circuit may quickly process data packets corresponding to the first plurality of operations without software involvement but may rely on software assistance for data packets corresponding to the second plurality of operations. In some examples, the first plurality of operations may comprise the most frequently transferred packet types and/or correspond to the least complex operations, whereas the second plurality of operations may comprise less frequently used, more complex, and/or new operations for which the NIC circuit is not designed to handle. In this regard, the NIC circuit may provide higher performance operation for a majority of operations in the IC, while the software assistance may provide flexibility and forward compatibility. In some examples, the NIC circuit may support remote direct memory access (RDMA) over converged Ethernet (RoCE) to perform data transfers to and between an Ethernet interface and a memory coupled to the memory interface circuit.

Figure 1:
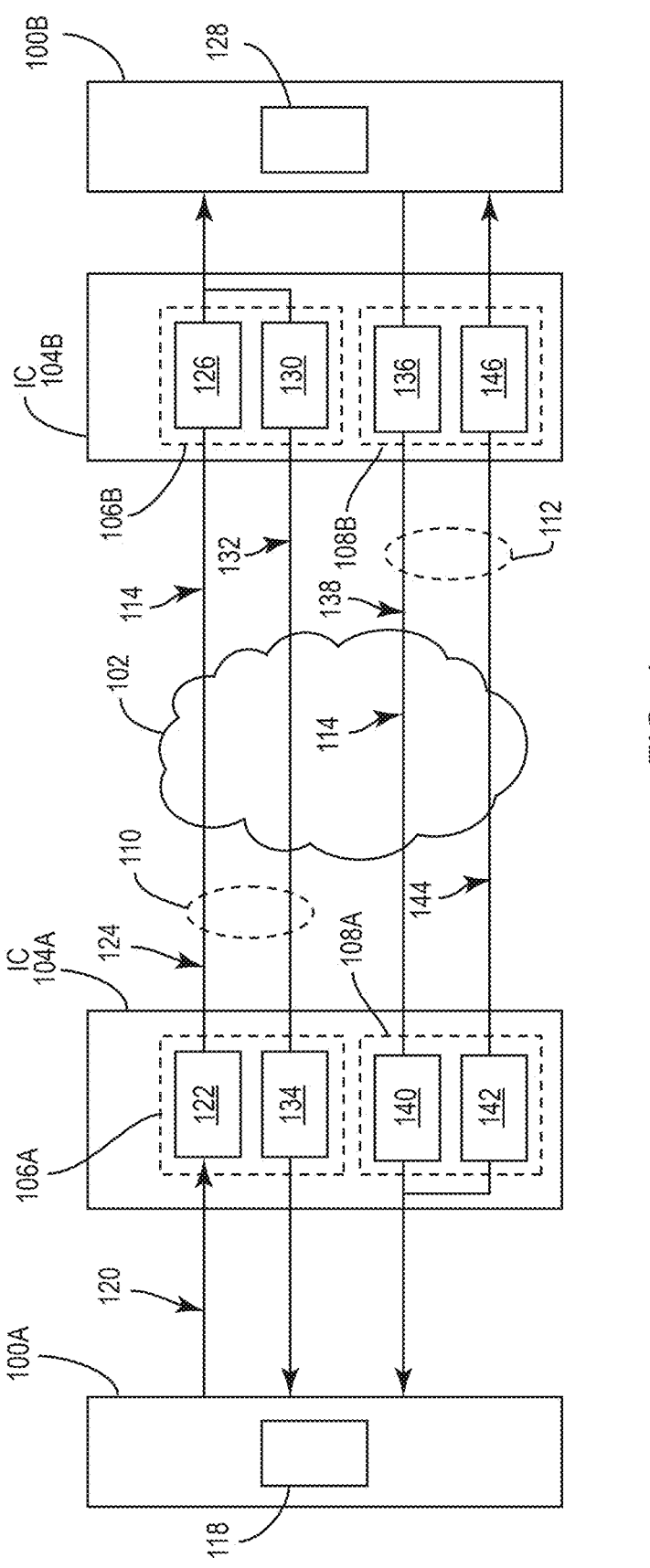
FIG. 1 is a schematic diagram illustrating processor-based computing systems coupled to each other through a network interface, each computing system including a corresponding network interface controller (NIC) circuit for controlling transfers of data between the network interface and the computing system according to an interface protocol.

FIG. 1 is a schematic diagram illustrating processor-based computing systems ("computing systems") 100A and 100B that are each coupled to a network interface 102 through respective integrated circuits (ICs) 104A, 104B that further include network interface controller (NIC) circuits 106A/108A and 106B/108B for controlling transfers 110 and 112 of data 114 over the network interface 102. The data transfers 110, 112 transfer the data according to an interface protocol having multiple layers (e.g., transport, internet, link, etc.) that are managed by the NIC circuits 106A/108A and 106B/108B. In the first transfer 110 shown in FIG. 1, the computing system 100A may have previously communicated with the computing system 100B regarding data 114 that is to be transferred from the computing system 100A to the computing system 100B. In some examples, the computing system 100A stores the data 114 in a system memory 118 for transmission over the network interface 102 and sends an instruction 120 to the NIC circuit 106A to transmit the data 114.

The NIC circuit 106A includes a transmit interface 122 that sends a data packet 124, which may include the data 114 in a payload field, to the computing system 100B over the network interface 102. A receive interface 126 of the NIC circuit 106B on the IC 104B receives the data packet 124 and provides the data 114 to a system memory 128 of the computing system 100B. In response to the received data packet 124, a transmit interface 130 of the NIC circuit 106B transmits a response 132 on the network interface 102 back to the computing system 100A. The response 132 may be an acknowledgment (ACK) indicating the data packet 124 was received successfully, or the response 132 may be an error indication if there was a problem with the data packet 124, for example. A receive circuit 134 in the NIC circuit 106A may receive the response 132 and inform the computing system 100A that the data packet 124 was either successfully received and the transfer 110 is complete, or the transfer 110 was received with an error, which may require resending. The computing system 100A may respond to an error indication by resending the data packet 124. The computing system 100A may respond to an ACK by sending a next data packet containing more of the data 114 to be transferred to the computing system 100B.

The second transfer 112 of data 114 is in the opposite direction to the first transfer 110 but may be otherwise similar, employing a transmit interface 136 in the NIC circuit 108B to send a data packet 138 to a receive interface 140 in the NIC circuit 108A. A transmit interface 142 in the NIC circuit 108A sends a response 144 (e.g., ACK or error indication) back to a receive circuit 146 in the NIC circuit 108B to indicate whether the transfer was successful or not.

In some examples, the network interface 102 may be an Ethernet interface, and the protocol employed to transfer the data 114 may be remote direct memory access (RDMA) over converged Ethernet (RoCE).

Figure 2B:
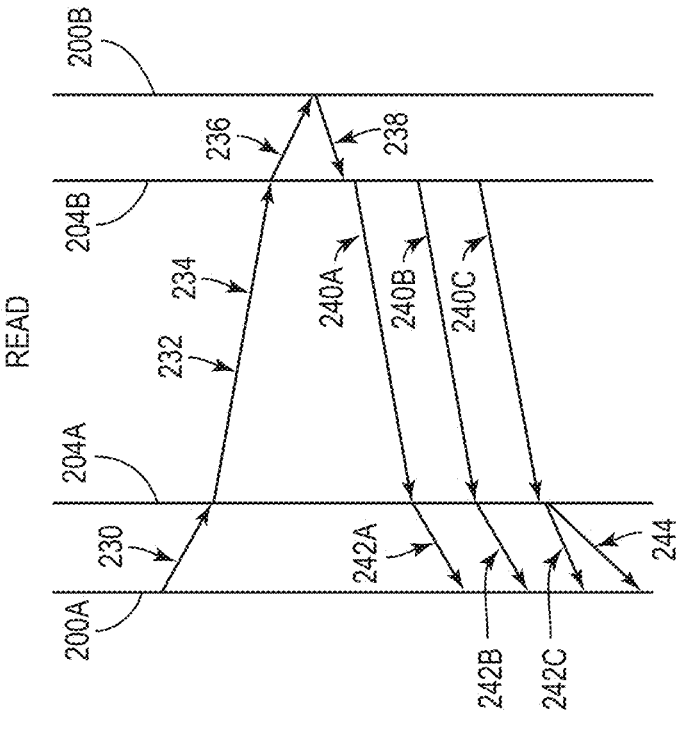
FIGS. 2A and 2B are flow diagrams illustrating communications that may occur in data transfers between the computing systems and their respective NIC circuits and through the network interface as shown in FIG. 1.
Figure 2A:
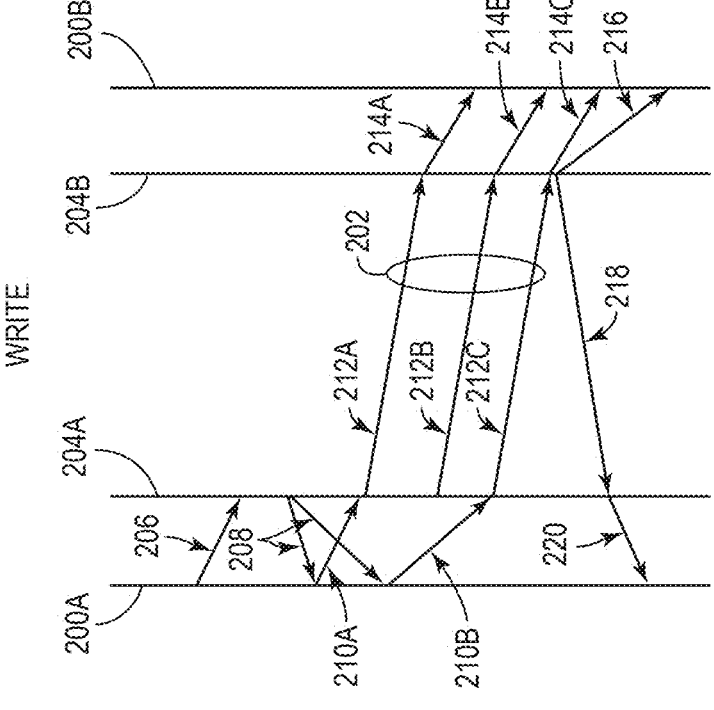

FIGS. 2A and 2B are flow diagrams illustrating more details of the communications that may occur in data transfers between computing systems and their respective NIC circuits, as shown in FIG. 1. FIG. 2A illustrates a write operation initiated by a computing system 200A, which may be the computing system 100A in FIG. 1, to transfer data 202 from the computing system 200A to a computing system 200B. In this example, the data 202 may be transferred directly from a system memory (not shown) of the computing system 200A into a system memory (not shown) of the computing system 200B without processor circuits in either of the computing systems 200A and 200B involved. The computing system 200A includes an NIC circuit 204A, and the computing system 200B includes an NIC circuit 204B.

As shown in FIG. 2A, the write operation begins with an instruction 206 from the computing system 200A to the NIC circuit 204A to perform the write operation. In some examples, the NIC circuit 204A has been preconfigured by the computing system 200A for the transfer. For example, registers in or associated with the NIC circuit 204A may be preconfigured to contain address information and a size of the data 202 to be transferred. In this example, the NIC circuit 204A responds to an instruction 206 with multiple requests 208 for the data 202 from a memory in the computing system 200A. The requests 208 may be provided directly to the system memory without involving a processor in the computing system 200A.

The data 202 is provided to the NIC circuit 204A in transfers 210A and 210B. The NIC circuit 204A generates data packets 212A-212C, with the data 202 being carried in data payloads of the data packets 212A-212C. In this example, more than one data packet 212A is employed because the size of the data 202 exceeds the maximum size of a data payload that can be carried in a single one of the data packets 212A-212C. The data packets 213A-213C are transferred over the network interface, and each of the data packets 212A-212C is received by the NIC circuit 204B of the computing system 200B. The NIC circuit 204B generates write operations 214A-214C to write the data 202 from each of the data packets 212A-212C (e.g., directly) into the system memory of the computing system 200B. In this regard, the NIC circuit 204B may also have been preconfigured with physical address information to identify locations where the data 202 is stored in response to the write operations 214A-214C. In response to the final data packet 212C being successfully received, indicating the end of the data transfer, the NIC circuit 204B sends a notice 216 to inform the computing system 200B that the transfer is complete and also sends a confirmation 218 back to the NIC circuit 204A indicating that the data 202 was successfully received. The NIC circuit 204A sends an indication 220 to inform the computing system 200A that the data transfer is complete.

A read operation illustrated in FIG. 2B is initiated by the computing system 200A sending an instruction 230 to the NIC circuit 204A, which generates and transmits a data packet 232 to the NIC circuit 204B of the computing system 200B. In this example, the data packet 232 has a packet type that does not carry data to the computing system 200B but includes a message 234, which may include an opcode (i.e., operational code) or instruction, an address, and an indication of the amount of data to be read, for example. The message 234 prompts the NIC circuit 204B to send a request 236 for data 238 from the system memory (not shown) of the computing system 200B. The NIC circuit 204B receives the data 238 from the system memory of the computing system 200B and transmits the data 238 in data payloads of data packets 240A-240C to the NIC circuit 204A. The NIC circuit 204A generates write operations 242A-242C to store the data 238 received in the data packets 240A-240C into the system memory of the computing system 200A. In response to the last data packet 240C, the NIC circuit 204A sends a notice 244 to inform the computing system 200A that the read operation has been completed.

Figure 3:
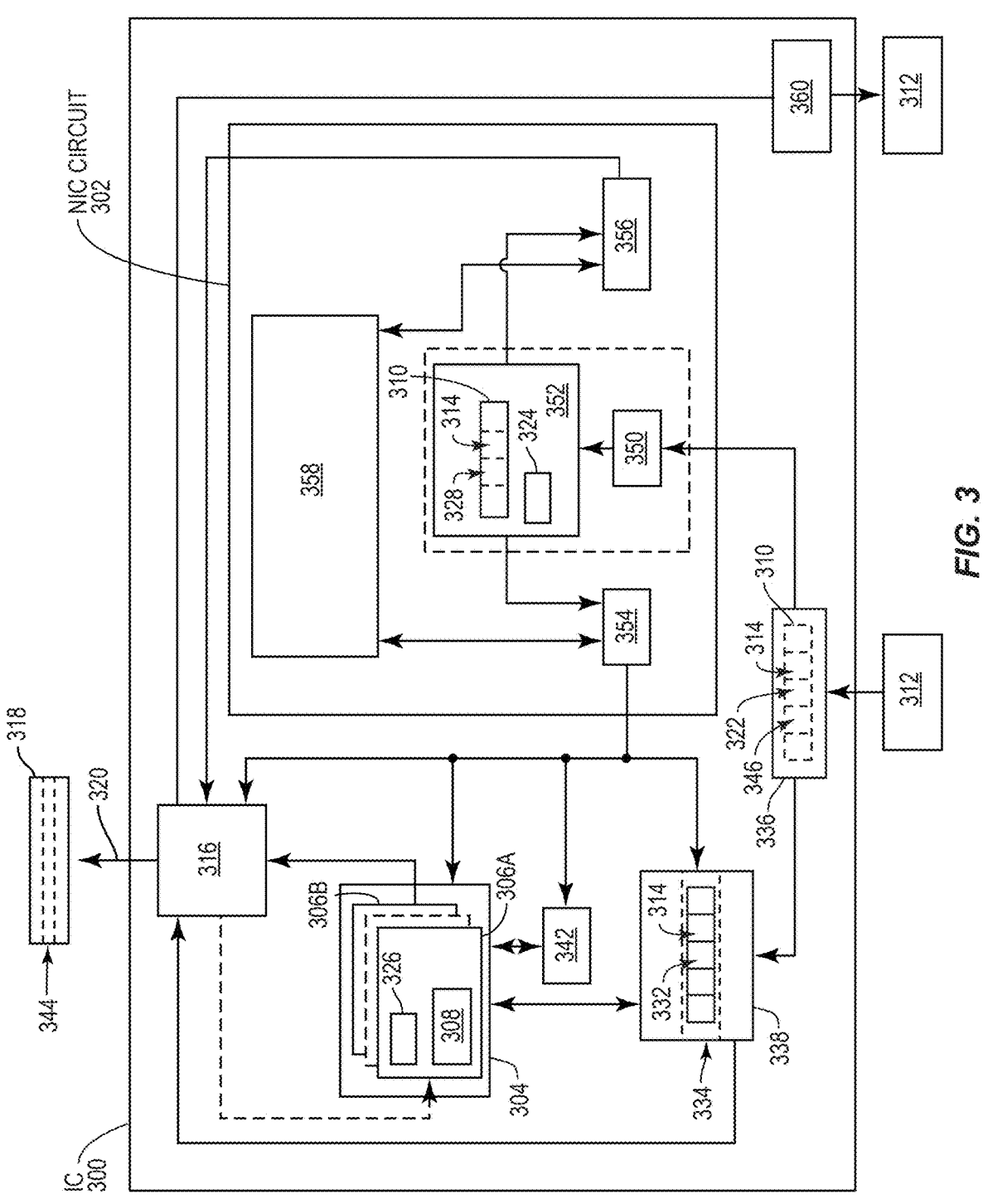
FIG. 3 is a schematic diagram of an exemplary integrated circuit including an NIC circuit and at least one processor circuit to execute software to assist the NIC circuit with data packets received on a network interface and transfer data to and from a memory interface.

FIG. 3 is a schematic diagram of an exemplary integrated circuit (IC) 300, including an NIC circuit 302 and a processor 304 comprising processor circuits 306A and 306B that are configured to execute software instructions 308 to assist the NIC circuit 302 with the reception and processing of a first data packet 310 received on a network interface 312. The first data packet 310 may be employed to transfer data 314 to a memory interface circuit 316 that couples to a system memory 318 by way of a memory interface 320. In an exemplary aspect, the IC 300 may replace the ICs 104A, 104B in the computing systems 100A and 100B in FIG. 1 to perform the communications shown in the flow diagrams in FIGS. 2A and 2B to provide greater flexibility and forward compatibility. The NIC circuit 302 may be the NIC circuits 204A and 204B in FIGS. 2A and 2B.

The NIC circuit 302 is coupled to the network interface 312, which may be coupled to one or more other computing systems, and configured to perform data transfer operations in a manner similar to those described with reference to FIGS. 1, 2A, and 2B. The system memory 318 may be accessed by the processor 304 and the computing system (e.g., computing system 100A) to which the IC 300 is coupled. In contrast to the ICs 104A, 104B in FIG. 1, the IC 300 includes at least one processor circuit 306A, 306B configured to execute software instructions to control the memory interface circuit 316 to assist the NIC circuit 302, as described below. The at least one processor circuit 306A, 306B represents any number of processor circuits that may be included in the processor 304.

In addition to containing control information for managing interface protocols of the network interface 312 (as known in the art), the first data packet 310 may also include header fields and/or opcodes (i.e., operational codes) that identify a packet type 322, also referred to herein as a message type, of the first data packet 310 and indicating a type of operation to be performed. The packet type 322 may indicate a particular operation that the IC 300 is being instructed or requested to perform. In the IC 300, the NIC circuit 302 includes logic circuits (i.e., hardware) that are provided to perform a predefined set of operations, referred to herein as a first plurality of operations 324, under hardware control. The packet type 322 may be used to determine whether an operation requested by the first data packet 310 is one of the first plurality of operations 324. If so, such an operation may be efficiently performed by the NIC circuit 302. Because the NIC circuit 302 comprises logic circuits configured to perform the first plurality of operations 324, execution of such operations may be optimized.

One or more of the processor circuits 306A, 306B may also be employed to control the network interface 312 and the memory interface circuit 316 based on software instructions (e.g., of programs, scripts, function calls, etc.) that may be executed in the processor circuits 306A, 306B. However, controlling the network interface 312 and the memory interface circuit 316 using software instructions executed in a processor circuit 306A, for example, to manipulate the network interface 312 and the memory interface circuit 316, may be much less efficient than direct control by logic circuits of the NIC circuit 302, causing the data transfers performed in the IC 300 to be completed at a slower pace than they are processed under control of the hardware logic circuits of the NIC circuit 302. For example, a rate of data flow (bandwidth) through the IC 300 (e.g., from network interface 312 to the memory interface 320) under software control may be in the range of 2% to 5% of the rate of data flow through the IC 300 under control of the NIC circuit 302.

For this reason, the NIC circuit 302 may be designed to perform the most frequently requested operations of the IC 300. Increasing the functionality of the NIC circuit 302 to handle more complex and less frequently executed operations increases the number of logic circuits in the NIC circuit 302, which may be an inefficient compromise in the design of the IC 300 when considering performance versus chip size. Thus, executing the second plurality of operations 326 under software control, by the processor circuits 306A, 306B may allow the size of the NIC circuit 302 to be smaller and less expensive. The first plurality of operations 324 may be the most frequently requested operations executed in the IC 300, and the at least one processor circuits 306A, 306B are called on to assist the NIC circuit 302 to control execution of a second plurality of operations 326. The set of operations in the second plurality of operations 326 may be entirely non-overlapping with the set of operations in the first plurality of operations 324, having no operations in common.

Alternatively, there may be one or more operations included in both of the second plurality of operations 326 and the first plurality of operations 324. In such examples, the NIC circuit 302 may execute such operations under normal conditions (e.g., for higher performance) but may call on the at least one processor circuit 306A, 306B to execute the operation under certain abnormal, unexpected, or error conditions. The NIC circuit 302 may call on the at least one processor circuit 306A, 306B for any reason to assist with handling the first data packet 310.

The second plurality of operations 326 may include operations that are less frequently requested/executed in the IC 300 or operations that are more complex. Preferably, implementing such operations under software control would not have a significant impact on the overall performance of the IC 300 because they are executed less often. In another aspect, the software instructions may be easily adapted to handle new operations and/or changes to existing operations that occur over time, such as when there are upgrades to network interface protocols. Thus, the IC 300 may be more forward compatible than an IC that does not include a software assist to the NIC circuit 302.

In operation, the NIC circuit 302 may receive the first data packet 310 on the network interface 312 and determine the packet type 322. In response to determining that the first data packet 310 includes a first packet type 328 corresponding to the first plurality of operations 324, the NIC circuit 302 controls the memory interface circuit 316 according to the first packet type 328. In other words, in response to the packet type 322 being the first packet type 328 requesting a data transfer operation to write data 314 of the first data packet 310 to the system memory 318, the NIC circuit 302 generates control signals and/or commands to the memory interface circuit 316 to transfer the first data 314 from a payload of the first data packet 310 to the system memory 318 coupled to the memory interface 320.

In response to the NIC circuit 302 determining that the packet type 322 of the first data packet 310 comprises a second packet type 332 corresponding to the second plurality of operations 326, the NIC circuit 302 sends a notification to the at least one processor circuit 306A, 306B to execute software instructions to control the memory interface circuit 316 according to the second packet type 332. In other words, the NIC circuit 302 may generate a signal, set a register bit, and/or write data to a configuration register, for example, to alert the processor circuits 306A, 306B that assistance is needed, to trigger execution of a program or routine that will generate the control signals and/or commands to the memory interface circuit 316 according to the second packet type 332. The at least one processor circuit 306A, 306B is configured to, in response to the notification from the NIC circuit 302, execute software instructions to control the memory interface circuit 316 according to the second packet type 332.

With further reference to FIG. 3, the IC 300 may include a packet receiver 336 to capture the first data packet 310 on the network interface 312. The IC 300 includes an on-chip memory 338 in which the first data packet 310 may be temporarily stored. In some examples, the at least one processor circuit 306A, 306B may execute software instructions to configure an address of a receive queue 340 in the on-chip memory 338. Configuring an address of the receive queue 340 may include determining an available region of the on-chip memory 338 and writing an address of such region into a register, for example. Such configuration may occur prior to receiving the first data packet 310.

The packet receiver 336 may store the first data packet 310 in the receive queue 340 regardless of whether the NIC circuit 302 or the software executed in the at least one processor circuit 306A, 306B will control the response to the first data packet 310. In other words, whether the packet type 322 is the first packet type 328 or the second packet type 332, the packet receiver 336 may store the first data packet 310 (or contents thereof) in the receive queue 340 that was previously configured for such purpose. The packet receiver 336 may also provide the first data packet 310 to the NIC circuit 302 for analysis and/or decoding. The NIC circuit 302 proceeds to handle the first data packet 310 if it corresponds to the first plurality of operations 324 or the NIC circuit 302 determines that the first data packet 310 is of the second packet type 332 corresponding to the second plurality of operations 326 and sends a notification to the processor circuits 306A, 306B to handle the first data packet 310. The notification that the NIC circuit 302 provides to the processor circuits 306A, 306B may include an address or location 334 of the receive queue 340 in the on-chip memory 338 where the first data packet 310 is located. Addresses in the on-chip memory 338 may be configured for each of the data packets received in the packet receiver 336.

The IC 300 also includes an address translation table 342 to store physical addresses of locations in the system memory 318 that have been selected for storing the first data 314 associated with a particular virtual address. The virtual addresses of the first data 314 may also be provided in the first data packet 310. Thus, the NIC circuit 302 may access the address translation table 342 to determine a first physical address 344 in the system memory 318 corresponding to a first virtual address 346 received in the first data packet 310. The NIC circuit 302 controls the memory interface circuit 316 to transfer the first data 314 from the on-chip memory 338 (e.g., the receive queue 340) to the first physical address 344 in the system memory 318. Prior to the first data packet 310 being received in the packet receiver 336, the at least one processor circuit 306A, 306B may have been controlled to execute software instructions to configure the address translation table 342 to associate the first physical address 344 to the first virtual address 346. As discussed above, the computing system (not shown) in which the IC 300 is employed may communicate with another computing system regarding an upcoming data transfer and the addresses used by the respective computing systems for storing the first data 314 (that is to be transferred) may be identified and provided to the at least one processor circuit 306A, 306B.

Execution of an operation of the second plurality of operations 326 is disclosed. The second plurality of operations 326, which are handled by the software executed in the processor circuits 306A, 306B, for example, may also include a transfer of the first data 314 from the payload of the first data packet 310. In case the first data packet 310 comprises the second packet type 332 corresponding to one of the second plurality of operations 326, the NIC circuit 302 sends a notification to the at least one processor circuit 306A, 306B, which may include a first address of the first data 314 in the on-chip memory 338. In response to the second packet type 332, the at least one processor circuit 306A, 306B may be configured to control the transfer of the first data 314 from the on-chip memory 338 (e.g., the receive queue 340) to the memory interface circuit 316, access the address translation table 342 to translate a virtual address in the first data packet 310 to the physical address 344 in the system memory 318, and provide the first physical address 344 to the memory interface circuit 316 for storing the first data 314. That is, the at least one processor circuit 306A, 306B may execute software instructions to control the memory interface circuit 316 to transfer the first data 314 from the location 334 in the receive queue 340 in the on-chip memory 338 to the first physical address 344 in the system memory 318.

As noted, the first data packet 310 may include header fields and/or other fields that support multiple interface layer protocols (e.g., transport, internet, link, etc.) of the network interface 312. The protocols may involve establishing a connection between a source of the first data packet 310, and the IC 300 before the first data packet 310 can be transmitted. In accordance with one or more of the interface protocols, in some examples, the NIC circuit 302 may notify the at least one processor circuits 306A, 306B to send an acknowledgment (ACK), which may be a return data packet, to confirm receipt of the first data packet 310 on the network interface 312. The at least one processor circuit 306A, 306B may receive the notification and execute software instructions that cause the ACK to be sent on the network interface 312, according to the interface protocol. For data transfer operations that involve more data than the maximum payload capacity of a single first data packet 310, additional data packets may be received. In such cases, their contents may each be stored in the on-chip memory 338 and an ACK may be generated for each data packet or only for the last data packet, according to the protocol. When the transfer is complete, the at least one processor circuit 306A, 306B may execute instructions to cause the connection, which was established on the network interface 312 prior to receiving the first data packet 310, to be terminated according to the interface protocol.

In some examples, the NIC circuit 302 may identify an error associated with the first data packet 310. For example, the NIC circuit 302 may determine that a packet header field or opcode is invalid or unrecognizable. In response to identifying an error, the NIC circuit 302 may notify the at least one processor circuit 306A, 306B to execute software instructions to respond to the error according to the interface protocol. For example, in some cases, the first data packet 310 may not be able to be properly decoded, and the appropriate response according to the interface protocol may be to send a negative acknowledgment (NACK) to the source of the first data packet 310, requesting retransmission of the first data packet 310 to the IC 300.

In some examples, the network interface 312 may be an Ethernet interface for remote direct memory access (RDMA). Thus, the NIC circuit 302 and the software instructions executed by the processor circuits 306A, 306B may control the network interface 312 according to RDMA on converged Ethernet (RoCE), and the first packet type 322 may correspond to an RDMA message.

In more detail, the NIC circuit 302 includes a sequencing circuit 350 that receives the first data packet 310 from the packet receiver 336 and provides the first data packet 310 to a finite state machine 352, which determines the packet type 322. In some examples, the first data packet 310 corresponds to a data transfer (e.g., a write operation) to the system memory 318, which may be handled by a write processing circuit 354. Alternatively, the first data packet 310 may correspond to a data transfer from the system memory 318 (e.g., a read operation) to a computing system coupled to the network interface 312, which may be handled by a transmit circuit 356. The NIC circuit 302 also includes internal storage 358, which may store configuration information that may be needed to process any of the first plurality of operations 324. To complete read operations, the IC 300 includes a packet transmitter 360 coupled to the network interface 312.

FIG. 4 is a flow chart illustrating a method 400 in the IC 300 in FIG. 3, the method includes receiving, in a network interface controller (NIC) circuit 302, a first data packet 310 on a network interface 312 (block 402), and determining a packet type 322 of the first data packet 310 (block 404). The method 400 further includes, in response to determining that the first data packet 310 includes a first packet type 328 corresponding to a first plurality of operations 324, controlling a memory interface circuit 316 according to the first packet type 328 (block 408) and in response to determining that the first data packet 310 includes a second packet type 332 corresponding to a second plurality of operations 326, sending a notification to the at least one processor circuit 306A, 306B to process the first data packet 310 (block 408). In response to the notification, controlling, by the at least one processor circuit 306A, 306B based on software instructions, the memory interface circuit 316 according to the second packet type 332 (block 410).

FIGS. 5A and 5B are a flow chart illustrating a method 500 in the IC 300 in FIG. 3, including, in the at least one processor circuit 306A, 306B, configuring an address translation table 342 to associate a first virtual address 346 of first data 314 to be transmitted to the IC 300 with a first physical address 344 in the system memory 318 (block 502) and configuring a location 334 of a receive queue 340 to receive the first data packet 310 in an on-chip memory 338 (block 504). The method 500 further includes, in the NIC circuit 302, receiving the first data packet 310 on the network interface 312 (block 506), determining that the first data packet 310 comprises a second packet type 332 corresponding to the second plurality of operations 326 (block 508), sending a notification to the at least one processor circuit 306A, 306B to process the first data packet 310 (block 510), and providing, to the at least one processor circuit 306A, 306B, the location 334 of the receive queue 340 at which the first data packet 310 is stored (block 512). The method 500 further includes, in the at least one processor circuit 306A, 306B, accessing the location 334 of the receive queue 340 to read the first data packet 310 (block 514), accessing the translation table 342 to obtain the first physical address 344 corresponding to the first virtual address 346 (block 516), and controlling the memory interface circuit 316 to transfer the first data 314 from the reserve queue 340 to the first physical address 344 in the system memory 318 (block 518). The method 500 may not include all the steps performed by the NIC circuit 302 and the at least one processor circuit 306A, 306B that are required to complete a data transfer, and some aspects of the above method may be changed or omitted.

FIG. 6 is a block diagram of an exemplary processor-based system 600 that includes a processor 602 (e.g., a microprocessor), including an instruction processing circuit 604. The processor-based system 600 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 600 includes the processor 602. The processor 602 represents one or more general-purpose processing circuits, such as a microprocessor, central processing unit, or the like. More particularly, the processor 602 may be an EDGE instruction set microprocessor or other processor implementing an instruction set that supports explicit consumer naming for communicating produced values resulting from the execution of producer instructions.

The processor 602 is configured to execute processing logic in instructions for performing the operations and steps discussed herein. In this example, the processor 602 includes an instruction cache 606 for temporary, fast access memory storage of instructions accessible by the instruction processing circuit 604. Fetched or prefetched instructions from a memory, such as a main memory 608, over a system bus 610, are stored in the instruction cache 606. Data may be stored in a cache memory 612 coupled to the system bus 610 for low-latency access by the processor 602. The instruction processing circuit 604 is configured to process instructions fetched into the instruction cache 606 and process the instructions for execution.

The processor 602 and the main memory 608 are coupled to the system bus 610 and can intercouple peripheral devices included in the processor-based system 600. As is well known, the processor 602 communicates with these other devices by exchanging address, control, and data information over the system bus 610. For example, the processor 602 can communicate bus transaction requests to a memory controller 614 in the main memory 608 as an example of a slave device. Although not illustrated in FIG. 6, multiple system buses 610 could be provided, wherein each system bus 610 constitutes a different fabric. In this example, the memory controller 614 is configured to provide memory access requests to a memory array 616 in the main memory 608. The memory array 616 is comprised of an array of storage bit cells for storing data. The main memory 608 may be a read-only memory (ROM), flash memory, dynamic random-access memory (DRAM), such as synchronous DRAM (SDRAM), etc. and/or static memory (e.g., flash memory, SRAM, etc.), as non-limiting examples.

Other devices can be connected to the system bus 610. As illustrated in FIG. 6, these devices can include the main memory 608, one or more input device(s) 618, one or more output device(s) 620, a modem 622, and one or more display controllers 624, as examples. The input device(s) 618 can include any type of input device, including but not limited to input keys, switches, voice processors, etc. The output device(s) 620 can include any type of output device, including but not limited to audio, video, other visual indicators, etc. The modem 622 can be any device configured to allow an exchange of data to and from a network 626. The network 626 can be any type of network, including but not limited to a wired network (e.g., Ethernet) or wireless network, a private or public network, a local area network (LAN), a wireless local area network (WLAN), a wide area network (WAN), a BLUETOOTH™ network, and the Internet. The modem 622 can be configured to support any type of communications protocol desired. The processor 602 may also be configured to access the display controller(s) 624 over the system bus 610 to control information sent to one or more displays 628. The display(s) 628 can include any type of display, including but not limited to a cathode ray tube (CRT), a liquid crystal display (LCD), a plasma display, etc. The processor-based system 600 may also include an IC 650 that may be the IC 300 in FIG. 3, coupled to the system bus 610 and the network 626 for transferring data by way of data packets between the main memory 608 and the memory of another processor-based system, as described with reference to FIG. 1.

The processor-based system 600 in FIG. 6 may include a set of instructions 630 to be executed by the processor 602 for any application desired according to the instructions. The instructions 630 may be stored in the main memory 608, the processor 602, and/or the instruction cache 606 as examples of a non-transitory computer-readable medium 632. The instructions 630 may also reside, completely or at least partially, within the main memory 608 and/or within the processor 602 during their execution. The instructions 630 may further be transmitted or received over the network 626 via the modem 622, such that the network 626 includes the computer-readable medium 632.

While the computer-readable medium 632 is shown in an exemplary embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product or software that may include a machine-readable medium (or a computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from and write information to the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips that may be referenced throughout the above description may be represented by voltages, currents, electromagnetic waves, magnetic fields, optical fields, or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. An integrated circuit (IC), comprising:
a network interface controller (NIC) circuit coupled to a network interface;
a memory interface circuit coupled to a memory interface; and
at least one processor circuit;
wherein:
the NIC circuit is configured to:
receive a first data packet on the network interface;
determine a packet type of the first data packet;
in response to determining that the first data packet comprises a first packet type corresponding to a first operation of a first plurality of operations, control the memory interface circuit according to the first packet type; and
in response to determining that the first data packet comprises a second packet type corresponding to a second plurality of operations, send a notification to the at least one processor circuit to process the first data packet; and
the at least one processor circuit is configured to, in response to the notification, execute software instructions to control the memory interface circuit according to the second packet type.

2. The IC of claim 1, wherein the first operation of the first plurality of operations comprises a first transfer of first data from a payload of the first data packet to a system memory coupled to the memory interface.

3. The IC of claim 2, the IC further comprising:

an on-chip memory;

a packet receiver configured to store the first data packet in the on-chip memory; and an address translation table;

wherein the NIC circuit is further configured to:

access the address translation table to determine a first physical address in the system memory corresponding to a first virtual address received in the first data packet; and control the memory interface circuit to transfer the first data from the on-chip memory to the first physical address in the system memory.

4. The IC of claim 1, wherein:

the first data packet is received on the network interface based on a connection established according to an interface protocol; and the NIC circuit is further configured to send a notification to the at least one processor circuit to send an acknowledgment of the first data packet on the network interface.

5. The IC of claim 4, wherein:

the at least one processor circuit is further configured to receive the notification; and execute software instructions that cause the acknowledgment to be sent on the network interface according to the interface protocol.

6. The IC of claim 4, the NIC circuit further configured to:

in response to identifying an error associated with the first data packet, send a notification to the at least one processor circuit to execute software instructions to respond to the error according to the interface protocol.

7. The IC of claim 4, wherein:

the at least one processor circuit is further configured to execute software instructions to cause the connection to terminate according to the interface protocol.

8. The IC of claim 4, wherein:

the interface protocol on the network interface comprises remote direct memory access (RDMA) on converged Ethernet (RoCE); and the first data packet comprises an RDMA message.

9. The IC of claim 3, wherein:

the second plurality of operations comprises a transfer of first data from the payload of the first data packet;

the NIC circuit is further configured to inform the at least one processor circuit of a first address of the first data in the on-chip memory; and the at least one processor circuit is configured to:

control transfer of the first data from the on-chip memory to the memory interface circuit;

access the address translation table to translate the first virtual address in the first data packet to the first physical address in the system memory; and provide the first physical address to the memory interface circuit for storing the first data.

10. The IC of claim 9, wherein:

the at least one processor circuit is further configured to execute software instructions to configure an address of a receive queue for the first data packet in the on-chip memory; and the packet receiver is further configured to store the first data in the receive queue.

11. The IC of claim 3, wherein:

the at least one processor circuit is further configured to execute software instructions to configure the address translation table to associate the first physical address to the first virtual address of the first data.

12. The IC of claim 10, wherein:

the at least one processor circuit is further configured to execute software instructions to control the memory interface circuit to transfer the first data from the receive queue in the on-chip memory to the first physical address in the system memory.

13. A method in an integrated circuit (IC), the method comprising:

receiving, in a network interface controller (NIC) circuit, a first data packet on a network interface;

determining a packet type of the first data packet;

in response to determining that the first data packet comprises a first packet type corresponding to a first operation of a first plurality of operations, controlling a memory interface circuit according to the first packet type;

in response to determining that the first data packet comprises a second packet type corresponding to a second plurality of operations, sending a notification to at least one processor circuit to execute software instructions to process the first data packet; and in response to the notification, controlling, by the at least one processor circuit based on software instructions, the memory interface circuit to transfer data according to the second packet type.

14. The method of claim 13, wherein the first operation of the first plurality of operations comprises a first transfer of first data from a payload of the first data packet to a system memory coupled to a memory interface.

15. The method of claim 14, further comprising:

accessing an address translation table to determine a first physical address in the system memory corresponding to a first virtual address received in the first data packet; and controlling the memory interface circuit to transfer the first data from an on-chip memory to the first physical address in the system memory.

16. The method of claim 13, further comprising:

receiving the first data packet on the network interface based on a connection established according to an interface protocol; and sending a notification, by the NIC circuit, to the at least one processor circuit to send an acknowledgment of the first data packet on the network interface.

17. The method of claim 16, further comprising:

receiving the notification in the at least one processor circuit; and executing software instructions to cause the acknowledgment to be sent on the network interface according to the interface protocol.

18. The method of claim 16, the NIC circuit further configured to:

identify, by the NIC circuit, an error associated with the first data packet; and send a notification to the at least one processor circuit to execute software instructions to respond to the error according to the interface protocol.

19. The method of claim 16, further comprising:

executing, in the at least one processor circuit, software instructions to terminate the connection according to the interface protocol.

20. The method of claim 16, wherein:

the interface protocol on the network interface comprises remote direct memory access (RDMA) on converged Ethernet (RoCE); and the first data packet comprises an RDMA message.

21. The method of claim 15, wherein the second plurality of operations comprises a transfer of the first data from the payload of the first data packet, the method further comprising:

providing, by the NIC circuit, the at least one processor circuit a first address of the first data packet in the on-chip memory;

controlling, by the at least one processor circuit, the transfer of the first data from the on-chip memory to the memory interface circuit;

accessing, by the at least one processor circuit, the address translation table to translate the first virtual address in the first data packet to the first physical address in the system memory; and providing, by the at least one processor circuit, the first physical address to the memory interface circuit to store the first data.

22. The method of claim 15, further comprising:

executing, in the at least one processor circuit, software instructions to determine an address of a receive queue for the first data packet in the on-chip memory; and storing the first data in the receive queue.

23. The method of claim 15, further comprising:

executing, in the at least one processor circuit, software instructions to configure the address translation table to associate the first physical address to the first virtual address of the first data.

24. The method of claim 22, wherein:

the at least one processor circuit is further configured to execute software instructions to control the memory interface circuit to transfer the first data from the receive queue in the on-chip memory to the first physical address in the system memory.

\* \* \* \* \*